March 28, 1967  B. MOORE  3,311,743
OUTDOOR LIGHTING FIXTURE
Filed June 29, 1964
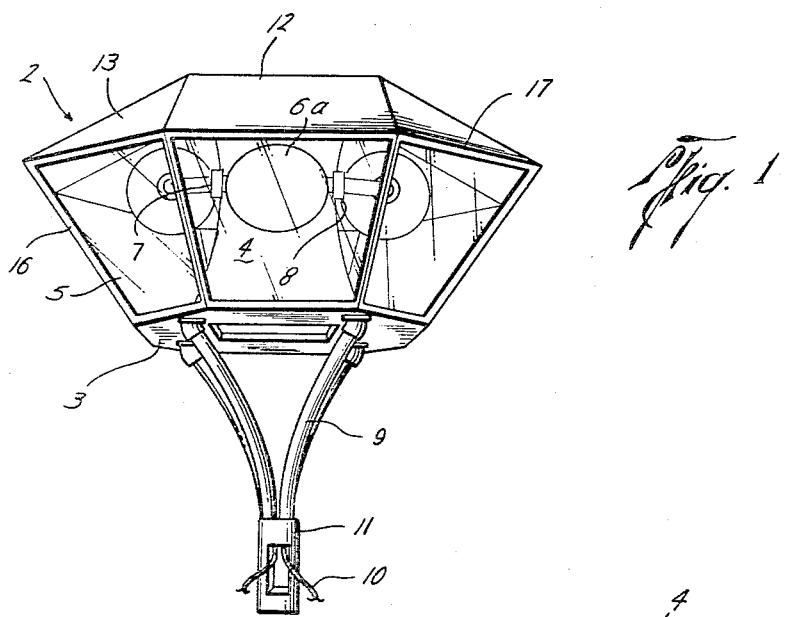
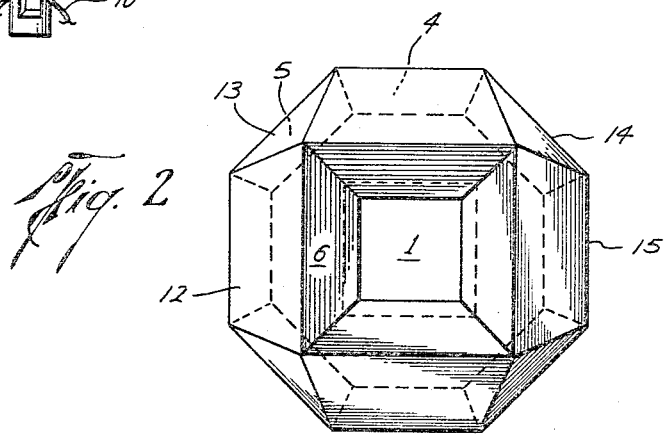
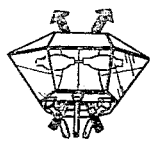
Buell Moore
INVENTOR.
BY
Arnold and Roylance
ATTORNEYS United States Patent Office 3,311,743
Patented Mar. 28, 1967

3,311,743
OUTDOOR LIGHTING FIXTURE
Buell Moore, Houston, Tex., assignor to Wide-Lite Corp., division of Esquire, Inc., Houston, Tex., a corporation of Texas
Filed June 29, 1964, Ser. No. 378,653
3 Claims. (Cl. 240—3)

This invention relates to light fixtures and more particularly to light fixtures of the outdoor type such as used in parking lots and having a central opening for cooling the bulbs mounted therein.

Mercury vapor lamp bulbs having large wattage ratings are widely being used to provide efficient lighting of large outdoor areas such as parking lots and streets. In many installations it has been found practical to mount bulbs in clusters, for instance where tall towers are used to give good overall illumination coverage while reducing the number of mounting structures.

Bulbs mounted in fixtures open to the atmosphere, and therefore to ordinary air circulation to effect cooling, are also subjected to undesirable atmospheric conditions such as rain, dew, hail, dust, bugs, etc., and are exposed to vandalism.

Enclosed fixtures have in the past suffered from the lack of circulation of necessary cooling air. Even singly-mounted bulbs often overheat and burn out long before their life expectancy. The problem becomes particularly acute when bulbs are mounted in clusters since greater temperatures are present.

When enclosed fixtures have been employed, in order to dissipate the heat produced by the bulbs, the enclosures have either been extremely large so as to entrap as much air as possible or they have employed an auxiliary cooling device, such as an expensive blower fan.

Therefore, one embodiment of the invention described and illustrated herein is a ruggedly enclosed light fixture principally for use out of doors, comprising an enclosure having a central vertical passageway, the passageway being narrowest near its center and gradually flaring to a larger dimension at either end, and
a plurality of sockets for mounting bulbs, typically of the mercury vapor type, the mounted bulbs being disposed within the enclosure and spaced around and close to the passageway, the walls of the passageway acting as reflectors for the bulbs, whereby the heat produced by the bulbs during operation causes the walls of the central passageway to heat establishing turbulent air currents through the central passageway by a Venturi effect, thereby dissipating the heat from the walls of the passageway, and hence from the bulbs.

Briefly, the embodiment illustrated is an enclosed fixture for the mounting of four mercury vapor bulbs having large wattage ratings, on the order of 1000 watts each. The transparent panes through which the light from the bulbs shines are arranged octagonally, four of the panes being placed directly opposite each of the four bulbs and the other four panes allowing maximum side illumination.

The fixture has a central vertical passageway with a Venturi-type contour. The four walls forming the confines of the central passageway also conveniently form reflectors for each of the four lights.

In operation, the bulbs transmit heat to their reflectors thereby causing turbulent air currents to be established in the passageway. These air currents dissipate heat from the walls of the passageway and hence from the bulbs, achieving the required and necessary cooling.

More particular description of the invention may be had by reference to the embodiment thereof which is illustrated in the appended drawings, which form a part of this specification. It is to be noted however, that the appended drawings illustrate only a typical embodiment of the invention and therefore is not to be considered limiting of its scope for the invention will admit to other equally effective embodiments.

In the drawings:

FIG. 1 is a front pictorial view of one embodiment of the invention, partly in cutaway.

FIG. 2 is a top schematic representation of the illustrated embodiment of the invention.

FIG. 3 is a pictorial view of the invention depicting the flow of air currents during operation of the invention.

Referring now to FIG. 1, a light fixture is shown which is normally mounted at the top of a platform or pedestal (not shown) for providing efficient lighting to a large ground area, such as a parking lot. The fixture is generally octagonal and is substantially symmetrical about its center, vertical axis. Passing vertically through the center of the structure is an opening passageway 1, the particular configuration of which is important to the invention and which is discussed below.

The structure generally has a roof 2, a bottom 3, eight transparent panes, such as panes 4 and 5, and four reflectors 6 that enclose the area in which light bulbs 6A are mounted. The enclosed structure is sufficiently sealed that all forms of precipitation, dust, bugs and virtually all other types of environmental conditions that are harmful to exposed bulbs are shut out from the enclosed part of the structure.

Mounted inside the enclosed structure are sockets 7 and holding supports 8 for mounting four mercury vapor arc-type lamp bulbs 6A. When bulbs are inserted in the sockets, they are arranged symmetrically about the central passageway 1 such that one bulb is centered on each of the four reflectors 6.

The structure is attached to its mounting device, such as a platform or pedestal support, via support bracket 9, which nominally has four legs as shown. The bracket may be made from corrosive resistant, light-weight aluminum or similar material. The wires 10 connecting the light sockets 7 to the power source pass through the hollow legs of the bracket 9 to wiring fixture 11, secured to, or part of, bracket 9. There the wires are connected in accordance with the prevailing power requirements to wiers from the mounting device.

The roof comprises essentially two shapes of panels, viz. a trapezoidally shaped panel 12 and a triangularly shaped panel 13. The panes are arranged alternately one shape and then the other around the central passageway 1 so as to form a peaked roof sloping downwardly and outwardly from the central, vertical axis. The lower roof lines 14 and 15 of panels 13 and 12 respectively are substantially equal in length so that the outline of the lower roof line taken as a whole forms a substantially symmetrically octagon as shown in FIG. 2.

The bottom 3 of the enclosed portion of the structure is also octagon, but of a lesser diameter than the roof line described above, and is concentric with this roof line. This establishes a downward and inward slope for transparent panes 4 and 5, so that light shining from the fixture is directed to the ground below and so that rain and the like will not interfere with operation.

Panes 4 and 5 are dimensionally equal so that only one size panel is utilized, facilitating interchangeability. The panes 4 are positioned directly opposite the light bulb locations. The panes 5 are positioned between the panes 4. This combined arrangement allows light to shine directly from a bulb through each of the panes 4 and at the "corners" for the light from two bulbs to aid in shining through the panes 5. The optimum illumination around the entire fixture from the four bulbs is obtained by this arrangement.

The panels 12 and 13 and the frame, or rib, pieces 16 into which the transparent panes 4 and 5 are secured are preferably made of extruded aluminum, although other type construction is possible. Silicone gaskets are preferably used around the edges of the panes as effective sealers against environmental conditions. The pane material is typically shatterproof glass, although a heavy, clear plastic material for the panes could also be used.

Panes 4 and 5 are hinged at their upper edges, or at the roof line 14 and 15, with hinges 17 of corrosive-resistant material, such as stainless steel. These hinges allow the panes to be swung forward from the bottom so that the bulbs can be replaced with ease.

The sockets 7 for the bulbs and the related socket supports 8 are arranged to secure the bulbs around the central opening of the fixture. The sockets are preferably Mogul grip type compatible with the light bulb operation and the supports are preferably asbestos lined. When mounted in their sockets, each bulb is centered on a reflector 6 and placed a very short distance therefrom.

A reflector 6 as shown in FIG. 1 is approximately hyperbolic and has its narrowest width dimension near its center, the width of the reflector gradually flairing toward each of its ends, i.e., where the reflector meets with the roof 2 and with the bottom 3 of the enclosed portion of the structure. The reflectors are preferably made of flat Alzak sheet material having a reflecting factor of about 85 percent although other material could also be used.

The center vertical passageway through the fixture is formed by the four reflectors located behind the light bulbs. The resulting configuration of the opening thereby defined is a vertical opening having a shape that is fairly wide at the bottom, becomes gradually smaller until it reduces to its narrowest dimension somewhere near its middle, and then becomes gradually larger again until it meets the peak of the roof. The shape is very condusive, therefore, for operation of the Venturi effect, as explained below.

When the bulbs heat the reflectors 6, air currents are initiated in passageway 1 of the structure moving from bottom to top, as shown in FIG. 3. These air currents occur because the heated air in the vicinity of the heated reflectors rise with respect to the cooler, or unheated air. The maximum flow of the rising air is at the most narrow part of the opening, causing turbulent air currents to be established adjacent the reflectors.

These air currents tend to absorb and carry off the heat from the reflectors. Since the reflectors derive heat from the bulbs, the heat removed from the structure via the established air currents is really being removed from the bulbs themselves.

Although only one embodiment of the invention has been described, it is obvious that various substitutes or modifications of the structure may be made without varying from the scope of the invention.

What is claimed is:
1. An enclosed outdoor lighting fixture, comprising
an enclosure having a central vertical passageway, said passageway being shaped to cause upward movement of air by the Venturi effect by having its narrowest dimension near its center and gradually flaring to a larger dimension at its bottom opening and its largest dimension at its top opening, said passageway being free from obstructions, and
a plurality of sockets adapted to receive lighting bulbs such that they are disposed within the enclosure and spaced around and close to the wall of said passageway,
the heating effect of the bulbs establishing air currents in said passageway, said air currents flowing upward through said passageway and at a faster rate opposite the narrowest dimension than elsewhere, thereby cooling the walls of the passageway.

2. An eclosed outdoor lighting fixture in accordance with claim 1, wherein the walls of said passageway act as reflectors for the bulbs.

3. An enclosed outdoor lighting fixture, comprising
an enclosure having a central Venturi-shaped passageway,
said passageway narrowing to its smallest dimension near its center and its largest dimension at its top opening, and
a bulb located within said enclosure and positioned close to a wall of said central passageway, the operation of said bulb heating the wall of said passageway causing air currents upward through said passageway by a Venturi effect, thereby cooling said bulb.

References Cited by the Examiner
UNITED STATES PATENTS 2,641,687   6/1953   Akely _____ 240—47 X
2,790,510   4/1957   Brabec _____ 55—358

NORTON ANSHER, *Primary Examiner.*

C. R. RHODES, *Assistant Examiner.*